May 19, 1970   J. W. RICH ET AL   3,512,822
COMBINATION LIQUID AND METAL SHOCK ABSORBING BUFFERS
Filed Nov. 20, 1968
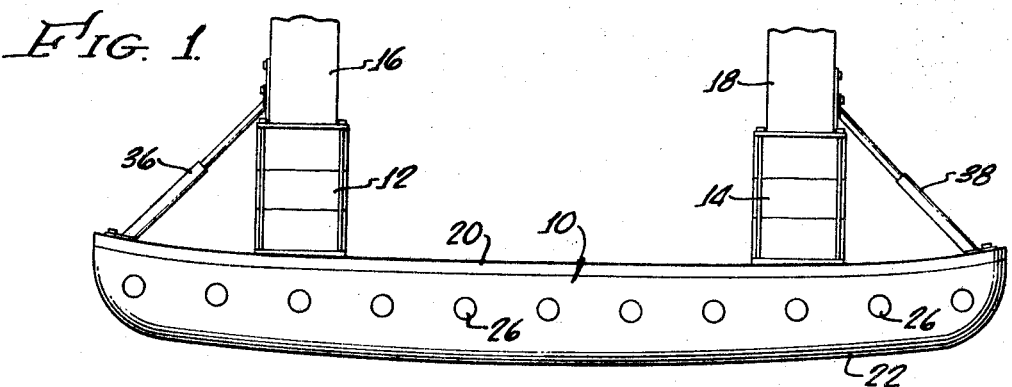
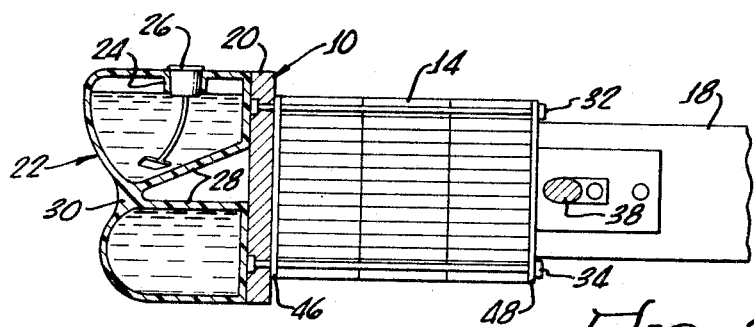
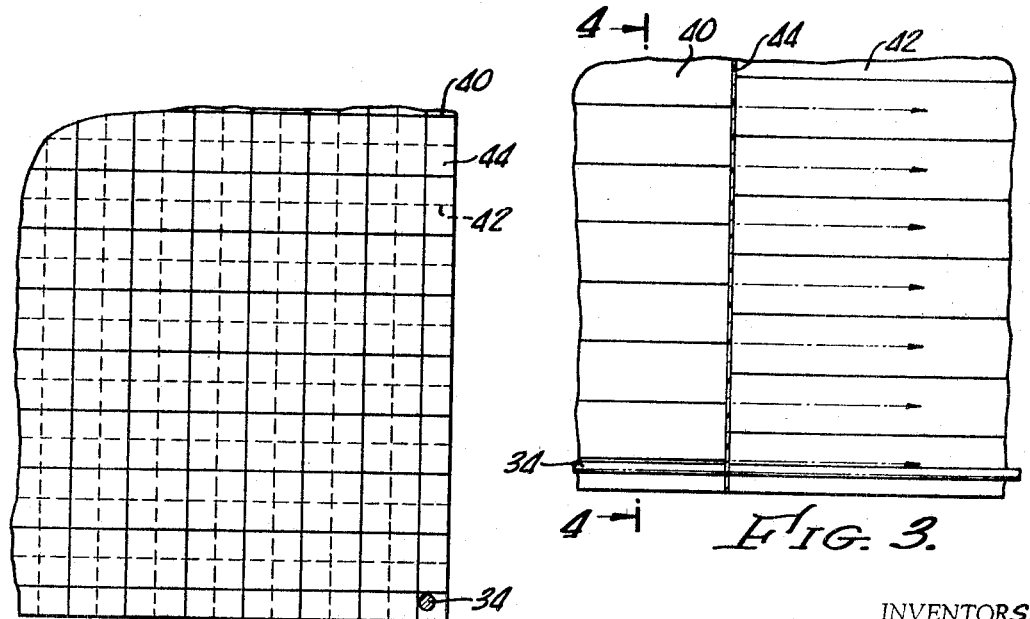
INVENTORS.
GRANT W. WALKER
JOHN W. RICH
BY
KIMMEL, CROWELL
& WEAVER
ATTORNEYS.

United States Patent Office 3,512,822
Patented May 19, 1970

3,512,822
COMBINATION LIQUID AND METAL SHOCK ABSORBING BUFFERS
John W. Rich, 2117 Arden Way, and Grant W. Walker, 4339 Lantzy Court, both of Sacramento, Calif. 95825
Continuation-in-part of application Ser. No. 671,472, Sept. 28, 1967. This application Nov. 20, 1968, Ser. No. 777,317
Int. Cl. B60r *19/00, 19/04, 21/00*
U.S. Cl. 293—1                                    7 Claims

ABSTRACT OF THE DISCLOSURE

A combination bumper including a normally water filled buffer member securing to one side of a backing plate and shear action energy absorbing material secured to the other side of the backing plate is disclosed. The buffer member is a resilient elongate member normally filled with water including normally closed apertures to permit displacement of the water there through at a rate and in a quantity commensurate with impact energy. The shear action energy absorbing means comprises sets of rigid sheets or matrices which are positioned relative to each other to intersect each other at the edges thereof such that when a force is exerted thereon the edges cut into the respective sheets thereby absorbing the impact energy.

CROSS-REFERENCE TO RELATED APPLICATIONS

This is a continuation-in-part of our co-pending application Ser. No. 671,472, filed Sept. 28, 1967, and is an improvement over the shock-absorbing buffer described in U.S. Pat. No. 3,284,122 issued to John W. Rich.

BACKGROUND OF THE INVENTION

Field of the invention

This invention relates generally to shock absorbing protective buffers for vehicles and, more particularly, relates to a combination shock absorber for reducing or preventing injury to persons riding in vehicles and damage to the vehicles upon collision.

Description of prior art

Many efforts have been made to provide means for reducing damage done upon collision of a vehicle with another vehicle or with a fixed object. Several such devices are cited in the aforementioned patent of John W. Rich. The only such device to have attained technical or commercial importance of which we are aware, is of the type described in the aforementioned Rich patent, however.

Devices of this type are generally quite satisfactory and perform their function admirably, especially when the vehicles to which they are affixed are traveling at relatively low speeds. At higher speeds, however, and with heavier vehicles and under certain operating conditions it is, however, desirable to provide additional energy absorbing facility. It is, accordingly, a principal object of this invention to provide an improved combination shock absorbing bumper construction.

A highly efficient, lightweight, shear action absorbing construction has been described in our aforementioned co-pending application of which this constitutes a continuation-in-part. It has now been found that a combination of the type of shock absorbing buffer described in the aforementioned Rich patent and the shear action energy absorbing material described in our aforementioned co-pending application provides highly desirable features not attainable by the approaches described in the aforementioned application and patent alone. Accordingly, the object of this invention is to provide an improved combination shock absorbing bumper construction.

SUMMARY OF THE INVENTION

This invention constitutes a particular combination of the buffer member of the type described in the Rich patent with the shear action energy absorbing material described in our aforementioned application.

In general, the present invention comprises a backing plate with an elongate hollow buffer member secured to one side, the backing plate being secured by means including the shear action absorbing material to the vehicle to be protected.

It is, therefore, a principal object of this invention to provide a combination shear action and liquid expelling bumper construction.

A more specific object of this invention is to provide an approved bumper including an improved model of the liquid filled buffer.

Yet another specific object of this invention is to provide a combination bumper which includes means for preventing lateral shift of the backing plate to thereby increase the effectiveness of the shear action energy absorbing material. These specific constructions and embodiments described herein constitute highly specific and non-limiting objects of the invention.

Other objects of the invention will become apparent from the combinations and from the elements described herein from the specification and from the drawings to which reference is now made.

BRIEF DESCRIPTION OF THE DRAWING

FIG. 1 is a top plan view showing the overall bumper construction of this invention.

FIG. 2 is a side view in partial cross section showing the vertical configuration and construction of the bumper construction of this invention and the improved buffer member thereof.

FIG. 3 is a side view in partial cross section showing the construction of the shear action material utilized in this bumper construction.

FIG. 4 is an end view showing the shear action material used in the bumper construction of this invention and is taken substantially along lines 4—4 in the direction of the arrows as shown in FIG. 3.

DESCRIPTION OF THE PREFERRED EMBODIMENTS

Making reference now to FIG. 1, the bumper construction of this invention comprises a buffer assembly shown generally at 10 in combination with at least one and preferably two means including shear action energy absorbing material indicated generally at 12 and 14 for connecting the buffer assembly 10 to the vehicle, preferably to framed elements 16 and 18 of the vehicle.

As best shown in FIG. 2, the improved buffer member of this invention includes a rigid, or relatively rigid, backing member 20 which is preferably a laminated wood (plywood) having both faces, or at least one face, thereof covered with resin-bonded fiberglass to increase the resiliency, durability, and strength of the backing member without significantly increasing the weight of the bumper assembly.

The buffer member of this invention includes a front wall 20, which, of course, of resilient material according to the description and principle set forth in the aforementioned Rich patent. At least one, and preferably several, apertures 24 are normally closed with stoppers 26 which may be of the type described by John W. Rich in application Ser. No. 529,738, filed Feb. 4, 1966.

A significant improvement is illustrated in FIG. 2, however, as indicated by the V-shaped support 28 extending from the rear wall of the buffer member to the front wall and adjoined thereto as indicated generally at 30.

As illustrated in FIG. 2 also, the connecting means, in addition to including the shear action energy absorbing materials, includes fasteners 32 and 34 which secure the backing plate 20 to the frame 18 and like fasteners, not shown, for securing the other end of the backing plate 20 to the other frame 16.

In conventional bumper constructions it is of little consequence whether the bumper shifts laterally with respect to the vehicle. However, according to the principles and constructions described in our aforementioned co-pending application, it is essential for maximum efficiency that the impact energy be directed in a line substantially parallel to the sheets which form the shear action energy absorbing material. In the present construction it is highly desirable, if not necessary, that the impact energy be directed substantially longitudinally of the vehicle frame. To accomplish this result, angularly related struts, with respect to the backing plate and the frame, 36 and 38, are provided to prevent or substantially reduce lateral movement of the backing plate with respect to the vehicle. These struts may be secured to the backing plate and to the frame, or another portion of the vehicle, by any suitable means, such as bolts or screws as shown. The struts are preferably telescoping; however, telescoping struts are not essential. Simple rigid struts may be used if desired to prevent lateral movement.

The shear action energy absorbing material is adequately described in our aforementioned co-pending application, the entire disclosure of which is incorporated at this point herein by reference. However, for clarity, a brief description will be given making reference to FIGS. 3 and 4. The energy absorbing material comprises a plurality of sheets lying in approximately parallel planes adjacent a second plurality of sheets lying in another approximately parallel set of planes, the respective pluralities of sheets being so disposed that the respective planes interset each other. Thus, when the respective sets of sheets are forced toward each other the edges of the sheets in one set intersect and cut into the edges of the sheets in the other set. This continued cutting action dissipates the moving energy. These sheets are constructed of rigid material to prevent bending which would reduce or eliminate the shear action cutting of the sheets. As described in our co-pending application, these sheets may be made of hardened or stiffened paper, such as paper stiffened with various resins, e.g. epoxy resins, phenol formaldehyde resins, etc., or they may be made of fibers bonded together by various resins such as polyesters, phenol type resins, epoxy resins, etc. or may be formed of extruded plastics, such as the phenolic, the urea-formaldehyde resins, etc. All of these resins are commercially known and aer known to be of high strength and rigidity. Other plastics, of course, may be substituted since the only essential feature with respect to these sheets is that they be rigid and of sufficient toughness to prevent shattering, rather than cutting.

The first plurality of sheets is indicated at 40 and the second intersecting plurality of sheets is indicated at 42. The first set of sheets may include a set of relatively intersecting sheets and, likewise, the second plurality of sheets may include intersecting sheets lying in intersecting planes. Thus, a matrix formed for squares, hexagons, octagons, etc. defined by the intersecting sets of sheets may be formed. This matrix lies adjacent another like matrix and is displaced in such a manner that the respective sheets intersect each other, such that the edges cut through the respective edges of the other set of sheets when the two sets are moved together.

It is highly desirable for the reasons more fully stated in our aforementioned co-pending application to provide a barrier membrane 44 between the respective sets of relatively interesting sheets. This barrier membrane tends to fix the minimum energy at which the energy absorbing material begins to collapse with the relative cutting of the rigid sheets. Once the collapse has begun, the energy is absorbed until all of the sheets have cut and intersected all of the other sheets. The minimum energy to begin this energy absorbing process, however, is best controlled by adjusting the thickness and rigidity of the membrane 44.

Obviously, several sets of intersecting sheets and membranes may desirably be used, depending on the maximum travel permitted and the minimum space allowable and upon the amount of energy which must be dissipated.

In a specific embodiment, a hexagonal honeycomb matrix formed of sheets of phenol formaldehyde resin, the sheets having a width of about three inches, overlies a like matrix and is separated by a phenol formaldehyde membrane. The sheets may be from $1/64$ to $1/4$ inch in thickness but preferably are from about $1/16$ to about $1/8$ inch in thickness. The membrane is preferably of from $1/32$ to $1/16$ inch in thickness. Constructions of this type have been found to absorb energy at a relatively linear rate until the entire sets of intersecting sheets are collapsed to the width of one such intersecting sheet.

The combination of this invention provides unique advantages over the action of either type of absorption alone. Since a minimum impact energy is required to initiate the absorption of the shear action material, such material is not as readily adapted for absorption of both high and low speed impacts as might be desired, although combinations of different types of such materials may be used, and are contemplated within the scope of this invention. The water filled buffer assembly is more readily adaptable to preventing injury and damage from low speed impacts than is the shear action material. It has been found, however, that maximum protection from both low speed and high speed impacts may readily be provided by the combination bumper construction of this invention. Thus, the maximum energy from low speed impacts may be absorbed by the water filled buffer cushion without affecting the shear action energy absorber. At higher velocities, and correspondingly higher impact energies, however, the bulk of the impact energy may be absorbed in the shear action material.

Similarly, instantaneous energy dissipation is provided by the water filled buffer construction, but the amount of travel during energy absorption is somewhat limited by this type of construction because of engineering and esthetic requirements. Very significant amounts of travel, however, may be provided using the shear action material.

Thus, while neither type of absorption alone provides maximum flexibility, the combination not only provides such flexibility but provides unexpectedly greater energy absorption effectiveness. Thus, while the water filled buffer cushion approach permits effective reduction or prevention of injury at speeds in the three to fifteen mile per hour range and up to thirty or thirty-five miles per hour and the shear action material provides energy absorption in the ten to thirty mile per hour range, the combination may provide effective protection in a larger range of speeds, for example, from less than three miles per hour to greater than forty or forty-five miles per hour.

Obviously, all impact effects are not eliminated at higher speeds, for example, forty-five or fifty miles per hour. However, the consequences of such an impact are very greatly reduced. While injury of a person riding in a vehicle may not necessarily be prevented, a fatality may be prevented and a minor injury may result where, in the absence of the combination of this invention, a very serious and disabling injury or loss of life may result.

It will be apparent from the foregoing that a novel combination bumper concept and construction has been provided which effectively reduces or prevents injury and damage even at relatively high speeds and provides greater effectiveness at lower speeds.

While the specific embodiments described herein directly and by incorporation by reference constitute specific objects of the invention, such embodiments are not intended as limiting of the invention. Indeed, one skilled in the art would certainly be expected to make modifications and variations of this invention without departing from the scope and spirit thereof based upon the teachings herein and conventional engineering principles. Thus, it is contemplated that the scope of the invention shall be limited only by the claims which follow.

We claim:

1. A shock absorbing bumper construction for use on vehicles and the like which comprises the combination:
    a relatively rigid backing plate;
    at least one elongate hollow body member comprised of a resilient material of sufficient rigidity normally to to retain a predetermined shape, and of sufficient strength to resist rupture upon impact thereagainst secured to the backing plate,
    liquid normally filling said member,
    said member having at least one opening therein,
    means normally closing said opening whereby impact against said member serves to displace said means normally closing said opening to permit explusion therethrough of at least a portion of said liquid in a quantity and at a rate commensurate with the severity of impact and the consequent deformation of said body member; and
    means including interposed shear action energy absorbing means for connecting the backing plate to the vehicle, said shear action energy absorbing means comprising:
    a first plurality of rigid sheets (40); and
    adjacent thereto, a second plurality of rigid sheets (42) extending generally transversely thereto, said respective pluralities of sheets lying generally in parallel planes, such that when said sheets are moved into intersecting engagement with each other by impact the edges of the first plurality of sheets cut into the edges of the second plurality of sheets, said first plurality of sheets continuing to cut said second plurality of sheets at a rate commensurate with the impact, thereby absorbing the energy of impact by the cutting action of the respective sheets.

2. The bumper construction of claim 1 further comprising angularly disposed telescoping struts for preventing lateral movement of said backing plate relative to the vehicle.

3. The bumper construction of claim 1 further comprising an additional plurality of sheets intersecting the first plurality of sheets, and another additional plurality of sheets intersecting the second plurality of sheets, said respective intersecting sheets lying in generally parallel planes such that when moved together by impact, one additional set of sheets intersects and cuts the edge of the other additional set of intersecting sheets, said respective sets of intersecting sheets continuing to cut each other, thereby dissipating the impact energy.

4. The bumper construction of claim 3 further comprising angularly disposed telescoping struts for preventing lateral movement of said backing plate relative to the vehicle.

5. A shock absorbing bumper construction for use on vehicles and the like which comprises the combination of:
    a relatively rigid backing means;
    a liquid filled energy dissipating buffer means on one side of said backing means; and
    means including interposed shear action energy absorbing means for connecting the rigid backing means to the vehicle, said shear action energy absorbing means comprising:
    a first plurality of rigid sheets; and
    adjacent thereto a second plurality of rigid sheets extending generally transversely thereto, said respective pluralities of sheets lying generally in parallel planes, such that when said sheets are moved into intersecting engagement with each other by impact the edges of the first plurality of sheets cut into the edges of the second plurality of sheets; and further including
    an additional plurality of sheets intersecting the first plurality of sheets and a second additional plurality of sheets intersecting the second plurality of sheets, said respective additional intersecting sheets lying in generally parallel planes with each other, such that when moved together one set of additional intersecting sheets cuts the edge of the other set of additional intersecting sheets, said respective sets of sheets continuing to cut each other during impact at a rate commensurate with the severity of impact thereby absorbing and dissipating the impact energy.

6. The bumper construction of claim 5 further comprising angularly disposed telescoping struts for preventing lateral movement of said backing plate relative to the vehicle.

7. The bumper construction of claim 6 further comprising a membrane (44) lying between the respective sets of relatively intersection sheets to thereby fix the minimum energy at which the energy absorbing material begins to collapse with the relative cutting action of the rigid sheets.

References Cited

UNITED STATES PATENTS

| | | | |
|---|---|---|---|
| 1,597,621 | 4/1926 | Kleven | 293—83 |
| 2,227,560 | 1/1941 | Szabo | 293—86 |
| 2,251,347 | 8/1941 | Williams | 213—221 |
| 3,265,163 | 8/1966 | Gilbert et al. | 188—88 |
| 3,284,122 | 11/1966 | Rich | 293—60 |
| 1,696,429 | 12/1928 | Christen | 293—85 XR |

FOREIGN PATENTS 18,213  9/1911  Great Britain.

ARTHUR L. LA POINT, Primary Examiner

H. BELTRAN, Assistant Examiner

U.S. Cl. X.R.

188—1, 88; 213—221; 293—60, 70, 89, 99, 101